(12) United States Patent
Williams et al.

(10) Patent No.: US 6,702,533 B1
(45) Date of Patent: Mar. 9, 2004

(54) SAFETY SHEET SYSTEM FOR SECURING CARGO LOADS IN CARGO CONTAINERS

(75) Inventors: Randy Williams, Summertown, TN (US); Jay Tyer, Lake Forest, IL (US); Kevin A. Illescas, Warrenville, IL (US); Philip Groen, Rotterdam (NL); Terence Siegers, Rotterdam (NL)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/237,036

(22) Filed: Sep. 9, 2002

(51) Int. Cl.[7] .......................... B61D 45/00; B60P 7/135
(52) U.S. Cl. ................. 410/118; 410/119; 410/121
(58) Field of Search ..................... 410/118, 119, 410/97, 100, 125, 121; 296/100.15, 100.16

(56) References Cited

U.S. PATENT DOCUMENTS 6,368,036 B1   4/2002   Vario

Primary Examiner—D. Glenn Dayoan
Assistant Examiner—H. Gutman
(74) Attorney, Agent, or Firm—Schwartz & Weinrieb

(57) ABSTRACT

A safety sheet cargo tie-down system comprises a substantially rectangular safety sheet, and four securing straps which are fixedly secured to corner regions of the substantially rectangular safety sheet upon the forwardly disposed surface thereof. The securing straps are effectively brought around such corner regions to the rearwardly disposed surface so as to form a pair of securing straps arranged within a criss-crossed X-shaped array or arrangement. Each pair of securing straps has a slip-type fastener fixedly secured upon one free end portion of one of the securing straps, and the free end portion of the other one of the securing straps is passed through such fastener. In this manner, as each pair of securing straps is tightened, the safety sheet is properly secured with respect to cargo load barrels or drums. Further securing forces or pressures can be appropriately impressed or exerted upon the cargo load barrels or drums as a result of the proper inflation of inflatable air bags disposed within accordion pockets defined within the safety sheet.

20 Claims, 6 Drawing Sheets

SAFETY SHEET SYSTEM FOR SECURING CARGO LOADS IN CARGO CONTAINERS

FIELD OF THE INVENTION

The present invention relates generally to cargo tie-down systems, and more particularly to a new and improved cargo tie-down system which is especially useful in connection with the securing of cargo loads, such as, for example, cargo drums, within cargo containers which can be located upon or within, for example, trucks, railroad cars, airplanes, ships, or the like.

BACKGROUND OF THE INVENTION

Various conventional or PRIOR ART cargo loading and cargo tie-down or securing systems or techniques are of course well-known in the industry. One such conventional or PRIOR ART cargo loading and cargo tie-down securing system or technique is disclosed, for example, within FIG. 1 and is generally indicated by the reference character 10. A plurality of cargo loads, in the form of barrels or drums 12, are disposed within a cargo hold 14 of a cargo container 16, and in order to fixedly secure and retain the cargo drums 12 within the cargo container 16, a securing system, comprising in effect a grid or framework structure 18 fabricated from wood, is utilized. The primary disadvantage or drawback characteristic of such a conventional or PRIOR ART wooden grid or framework structure 18 resides in the overall relatively high costs involved in connection with such structures. For example, the raw material costs of the lumber are significant, and in addition, the labor costs involved in constructing the framework or grid structure 18 and securing the same to the interior wall or floor portions of the cargo container 16 are likewise considerable. Still further, when the cargo load reaches its destination, additional labor costs are required to be expended in order to deconstruct the framework or grid structure 18. Accordingly, an improved shipping technique has been warranted.

In light of the foregoing, an improved shipping technique was subsequently developed and is disclosed, for example, within U.S. Pat. No. 6,368,036 which issued to Vario on Apr. 9, 2002. In accordance with such a system or technique, as disclosed, for example, within FIG. 2, which corresponds to FIG. 3 of the aforenoted patent, a cargo truck storage compartment is disclosed at 56, and it is seen that the cargo truck storage compartment 56 comprises a back panel 63 of the truck, a left side wall 60, a right side wall 54, and the floor 66. The cargo to be transported comprises a plurality of nursery containers 67, and in order to secure the nursery containers 67 within the truck storage compartment 56, first and second panels 52,62 of a high tensile strength material are adhered to the right side wall 54 of the cargo truck storage compartment 56, while third and fourth panels 58,64 are similarly secured to the left side wall 60 of the cargo truck storage compartment 56. Each one of the panels 52,62,58,64 is a product which is commercially available from WALNUT INDUSTRIES, INC. of Philadelphia, Pa. under the trademarked product name TY-GARD2000®, and it is noted, in conjunction with, for example, panel 52, that panel 52 comprises a first section 53 which extends from a first end 55 of the panel 52 to a center portion 61 of the panel 52, and a second section 57 which extends from the center portion 61 of the panel 52 to the other end 59 of the panel 52. The first section 53 of the panel 52 has an adhesive disposed upon the back side thereof by means of which the panel 52 is adhesively bonded to the side wall 54 of the storage compartment 56, however, section 57 of the panel 52 does not have any adhesive material disposed upon the back side thereof and therefore is not adhesively bonded to the side wall 54 of the storage compartment 56. The other panels 62,58,64 have structures which are similar to that of panel 52.

As best seen in FIG. 3, which corresponds to FIG. 6 of the noted patent, after all of the nursery cargo items 66 have been loaded upon the truck between the left and right side walls 60,54 of the truck storage compartment 56, a gate 82 is positioned rearwardly of the cargo load 67, and as best seen in FIG. 4, which corresponds to FIG. 10 of the noted patent, the free end portions 59 of the panels 52 and 58, as well as the free end portions 59 of the panels 62 and 64, are overlapped as at 106. By using a special tightening tool 102, which has a vertically oriented slit 104 formed therein for accommodating the overlapped free end portions 106 of the panels 52,58, the overlapped free end portions 106 of the panels 52,58 can be inserted into the slit 104 of the tightening tool 102. Subsequently, upon twisting the tool 102 while the overlapped free end portions 106 of the panels 52,58 are disposed within the slit portion 104 of the tool 102 as shown in FIG. 5 which corresponds to FIG. 11 of the noted patent, the panels 52,58 are effectively pulled toward and tightened with respect to each other so as to securely fasten or retain the gate 82, and in turn, the cargo loads 67, within the cargo truck storage compartment 56. While the panels 52,58, as well as the panels 62,64, are then disposed within such tensioned states, an interface adhesive panel 92, having adhesive disposed upon the entire rear surface thereof, is adhered over each one of the intertwined regions 101, as shown in FIG. 3, which is formed by twisting the overlapped free end portions 106 of the panels 52,58 together as shown in FIG. 6, which corresponds to FIG. 12 of the noted patent. Subsequently, the tool 102 is removed from each intertwined region 101. In a manner similar to that characterizing the panels 52,62,58, 64, the interface adhesive panel 92 is commercially available under the trademarked product name TY-PATCH2000®, and is likewise available from WALNUT INDUSTRIES, INC. of Philadelphia, Pa.

While the cargo securing system or technique as disclosed within the noted patent to Vario is operationally viable, and obviously rectifies the economic deficiencies, disadvantages, or drawbacks characteristic of the conventional PRIOR ART wooden framework or grid structure system, it has nevertheless likewise proven to be relatively expensive, as well as being quite tedious and time-consuming to implement. Consequently, a need still exists in the art for a new and improved cargo tie-down system and technique which is especially adapted for use in connection with the tying-down or securing of bulk cargo loads, in the form of barrels, drums, palletized loads, or the like, within cargo containers located upon trucks, ships, railroads, airplanes, or the like, which is relatively simple in structure, which is relatively simple to install, and which is relatively inexpensive to fabricate.

OBJECTS OF THE INVENTION

Accordingly, it is an object of the present invention to provide a new and improved cargo-tie down system, and a method or technique for using the same, in order to secure cargo loads, such as, for example, palletized loads, barrels, drums, or the like, within cargo containers located upon trucks, ships, railroads, airplanes, or the like.

Another object of the present invention is to provide a new and improved cargo-tie down system, and a method or technique for using the same, in order to secure cargo loads, such as, for example, palletized loads, barrels, drums, or the like, within cargo containers located upon trucks, ships, railroads, airplanes, or the like, wherein such system and technique effectively overcome the various operational and fabrication disadvantages or drawbacks characteristic of conventional PRIOR ART cargo tie-down systems or techniques.

An additional object of the present invention is to provide a new and improved cargo-tie down system, and a method or technique for using the same, in order to secure cargo loads, such as, for example, palletized loads, barrels, drums, or the like, within cargo containers located upon trucks, ships, railroads, airplanes, or the like, wherein such system is relatively simple in structure.

A further object of the present invention is to provide a new and improved cargo-tie down system, and a method or technique for using the same, in order to secure cargo loads, such as, for example, palletized loads, barrels, drums, or the like, within cargo containers located upon trucks, ships, railroads, airplanes, or the like, wherein such system is relatively simple to effectively install and implement.

A last object of the present invention is to provide a new and improved cargo-tie down system, and a method or technique for using the same, in order to secure cargo loads, such as, for example, palletized loads, barrels, drums, or the like, within cargo containers located upon trucks, ships, railroads, airplanes, or the like, wherein such a system is relatively inexpensive to fabricate.

SUMMARY OF THE INVENTION

The foregoing and other objectives are achieved in accordance with the teachings and principles of the present invention through the provision of a new and improved cargo-tie down system, and a method or technique for using the same, in order to secure cargo loads, such as, for example, palletized loads, barrels, drums, or the like, within cargo containers located upon trucks, ships, railroads, airplanes, or the like, wherein the system comprises a cargo-retention, double-ply safety sheet, having a substantially rectangular configuration, to which four cargo-retention straps are fixedly sewn within the corner regions thereof. A first pair of the cargo-retention straps, comprising a relatively short retention strap and a relatively long retention strap, is effectively disposed along a first diagonal of the cargo-retention sheet, while a second pair of the cargo-retention straps, likewise comprising a relatively short retention strap and a relatively long retention strap, is disposed along a second diagonal of the cargo-retention sheet such that together, the four cargo-retention straps are arranged within an array having a substantially X-shaped configuration. More particularly, all of the cargo-retention straps have first end portions thereof fixedly sewn upon a forward-facing surface of the cargo-retention sheet, they are then respectively passed through snap-hooks which are adapted to be mated with and support upon support hooks fixedly mounted upon interior wall portions of the cargo container, and are effectively routed across the rearward-facing surface of the cargo-retention sheet so as to collectively be disposed within the aforenoted X-shaped array or arrangement. The relatively short cargo-retention straps of each pair of cargo-retention straps, disposed along each one of the diagonals of the cargo-retention sheet, have suitable, conventionally available female-strap fasteners fixedly mounted thereon, while the relatively long cargo-retention straps of each pair of cargo-retention straps, disposed along each one of the diagonals of the cargo-retention sheet, are adapted to be passed through the strap fasteners so as to achieve tightening of the cargo-retention straps. In addition to the aforenoted structure, the cargo-retention sheet is also provided with a pair of interior pockets within which a pair of inflatable air bags are disposed whereby as a result of the inflation of such inflatable air bags, suitable pressure forces are exerted or impressed upon the cargo loads for securing the same as well as for cushioning the cargo loads against impact forces.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
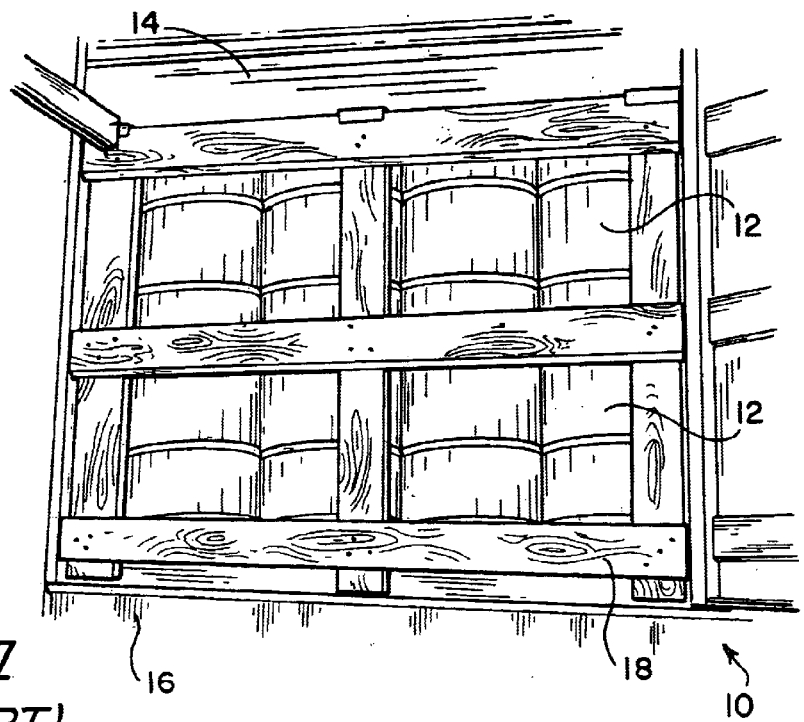
FIG. 1 is a rear elevational view of a first conventional PRIOR ART cargo-load retention system for use in connection with the retention of cargo loads within cargo containers.

Referring now to the drawings, and more particularly to FIGS. 7–10 thereof, a new and improved safety sheet cargo tie-down system, constructed in accordance with the principles and teachings of the present invention for securing cargo loads within cargo containers, is disclosed and is generally indicated by the reference character 110. More particularly, the safety sheet cargo tie-down system 110 of the present invention is seen to comprise a dual-ply safety sheet component 112 which may be fabricated from a suitable material, such as, for example, polypropylene, and as can be appreciated from FIGS. 9 and 10, the width and height dimensions of the safety sheet 112 are effectively tailored with respect to the width and height dimensions of the rear opening 114 of the cargo hold 116 defined within the cargo container 118. In this manner, the safety sheet 112 exhibits an area expanse which covers substantially the entire rear opening 114 of the cargo hold 116 of the cargo container 118 so as to not only secure the cargo loads, which are illustrated as comprising, for example, drums or barrels 120, within the cargo container 118, but in addition, to effectively and securely prevent any inadvertent discharge of the cargo loads 120 from the cargo hold 116 of the cargo container 118 when, for example, the rear doors 122 of the cargo container 118 are opened by workmen personnel in order to commence unloading of the cargo loads 120. In addition to the provision of the safety sheet 112 as the basic structural component of the new and improved safety sheet cargo tie-down system 110, as constructed in accordance with the principles and teachings of the present invention for securing cargo loads 120 within cargo containers 118, the new and improved safety sheet cargo tie-down system 110 further comprises other structural components integrally cooperative with the safety sheet 112 in order to render the safety sheet cargo tie-down system 110 a viable means for simply but securely tying-down the cargo loads 120 within the cargo container hold 116.

More particularly, the safety sheet 112 has a substantially rectangular configuration, and two pairs of securing straps 124,125, and 126,127 are adapted to be secured to the forwardly disposed surface 111 of the safety sheet 112 in such a manner that the pairs of securing straps 124, 125, and 126,127 will be subsequently arranged within an X-shaped array or arrangement across the rearwardly disposed surface 113 of the safety sheet 112 when they are mated together, as will become more apparent shortly hereafter. In particular, as viewed in FIG. 8 and with respect to the rearwardly disposed surface 113 of the safety sheet 112, the first pair of securing straps 124,125 extends along a first diagonal of the safety sheet 112 as defined between oppositely disposed corner regions 128,130 of the safety sheet 112, while the second pair of securing straps 126,127 extends along a second diagonal of the safety sheet 112 as defined between oppositely disposed corner regions 132,134 of the safety sheet 112. In order to actually form the X-shaped array or arrangement of the securing straps 124,125, 126,127, whereby the securing straps 124,125,126,127 extend across the rearwardly disposed surface 113 of the safety sheet 112 and along the criss-crossed diagonals thereof, it is noted that, in accordance with the teachings and principles of the present invention, and as can best be seen in FIG. 7, first end portions 136,138 of the securing straps 124,125, which are respectively disposed within the immediate vicinities of the corner regions 128,130 of the safety sheet 112, are fixedly secured to the forwardly disposed surface 111 of the safety sheet 112 by suitable means, such as, for example, sewn stitching, while in a similar manner, first end portions 140,142 of the securing straps 126,127, which are respectively disposed within the immediate vicinities of the corner regions 132,134 of the safety sheet 112, are likewise fixedly secured to the forwardly disposed surface 111 of the safety sheet 112 by sewn stitching.

Figure 8:
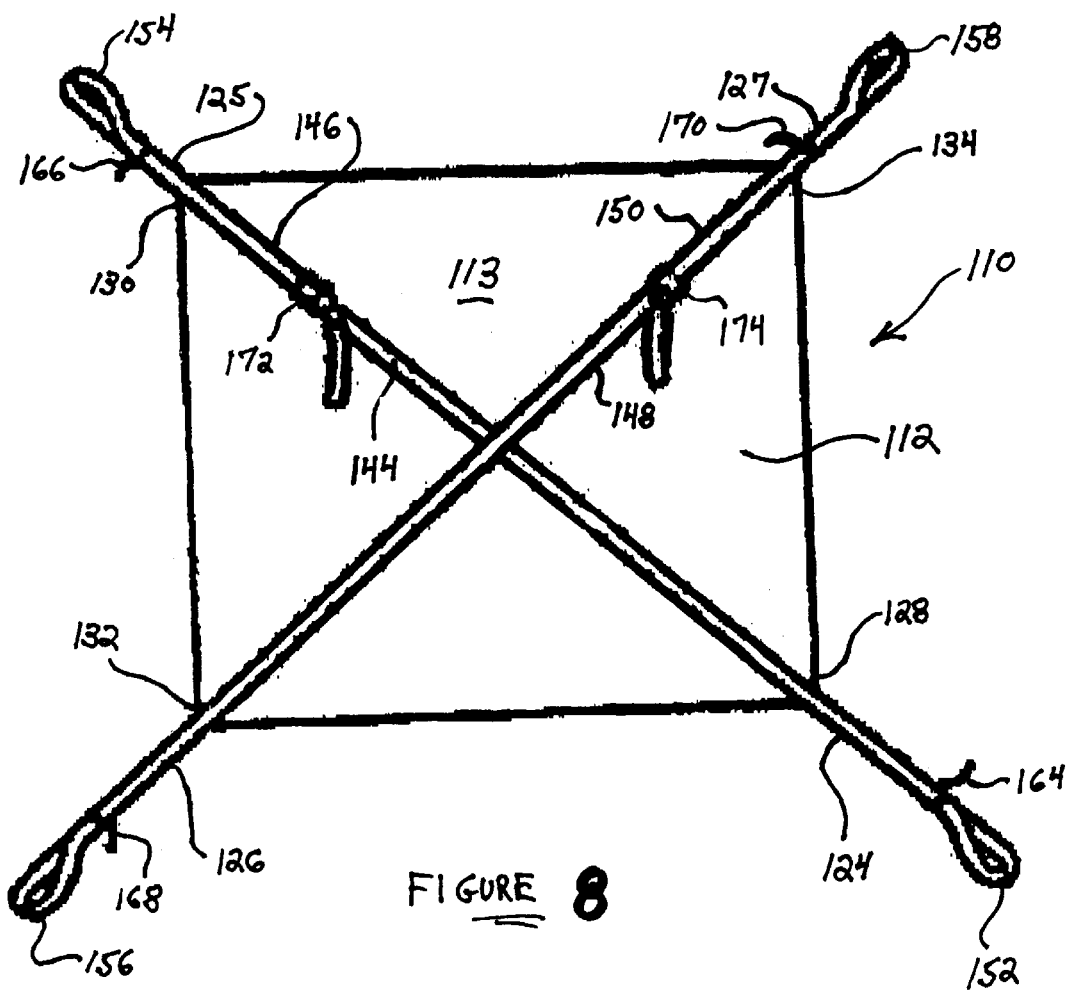
FIG. 8 is a rear elevational view, corresponding to the front elevational view of FIG. 7, of the new and improved safety sheet cargo tie-down system constructed in accordance with the principles and teachings of the present invention for securing cargo loads within cargo containers.

After each one of the first end portions 136,138, 140,142 of the securing straps 124,125,126,127 is fixedly secured to a respective one of the corner regions 128,130, 132,134 of the forwardly disposed surface 111 of the safety sheet 112, the securing straps 124,125,126,127 are effectively routed around the corner regions 128,130,132,134 of the safety sheet 112 and second free end portions 144,146 of the paired securing straps 124,125, as well as second free end portions 148,150 of the paired securing straps 126,127, are brought across the rearwardly disposed surface 113 of the safety sheet 112 and disposed toward each other along the diagonals of the safety sheet 112 so as to subsequently be mated together into the aforenoted pairs 124,125 and 126,127 of securing straps whereby the pairs of securing straps 124,125, and 126,127 will be disposed within the X-shaped array or arrangement as best seen in FIG. 8. Accordingly, when the pairs of securing straps 124,125, and 126,127 are mated together and disposed within the aforenoted X-shaped array or arrangement, it is noted that, as viewed in FIG. 8, securing strap 124 extends upwardly across the rearwardly disposed surface 113 of the safety sheet 112 from the lower right corner 128 of the safety sheet 112 toward the upper left corner 130 of the safety sheet 112, while the paired or mated securing strap 125 extends downwardly across the rearwardly disposed surface 113 of the safety sheet 112 from the upper left corner 130 of the safety sheet 112 toward the lower right corner 128 of the safety sheet 112. In a similar manner, the securing strap 126 extends upwardly across the rearwardly disposed surface 113 of the safety sheet 112 from the lower left corner 132 of the safety sheet 112 toward the upper right corner 134 of the safety sheet 112, while the paired or mated securing strap 127 extends downwardly across the rearwardly disposed surface 113 of the safety sheet 112 from the upper right corner 134 of the safety sheet 112 toward the lower left corner 132 of the safety sheet 112.

Figure 7A:
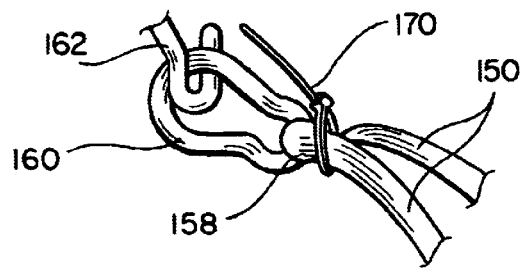
FIG. 7a is an enlarged detail view of one of the corner strapping loops of the tie-down system as illustrated within FIG. 7 showing the attachment of the corner strapping loop to a suspension hook fixedly mounted upon an interior wall portion of the cargo container.
Figure 7:
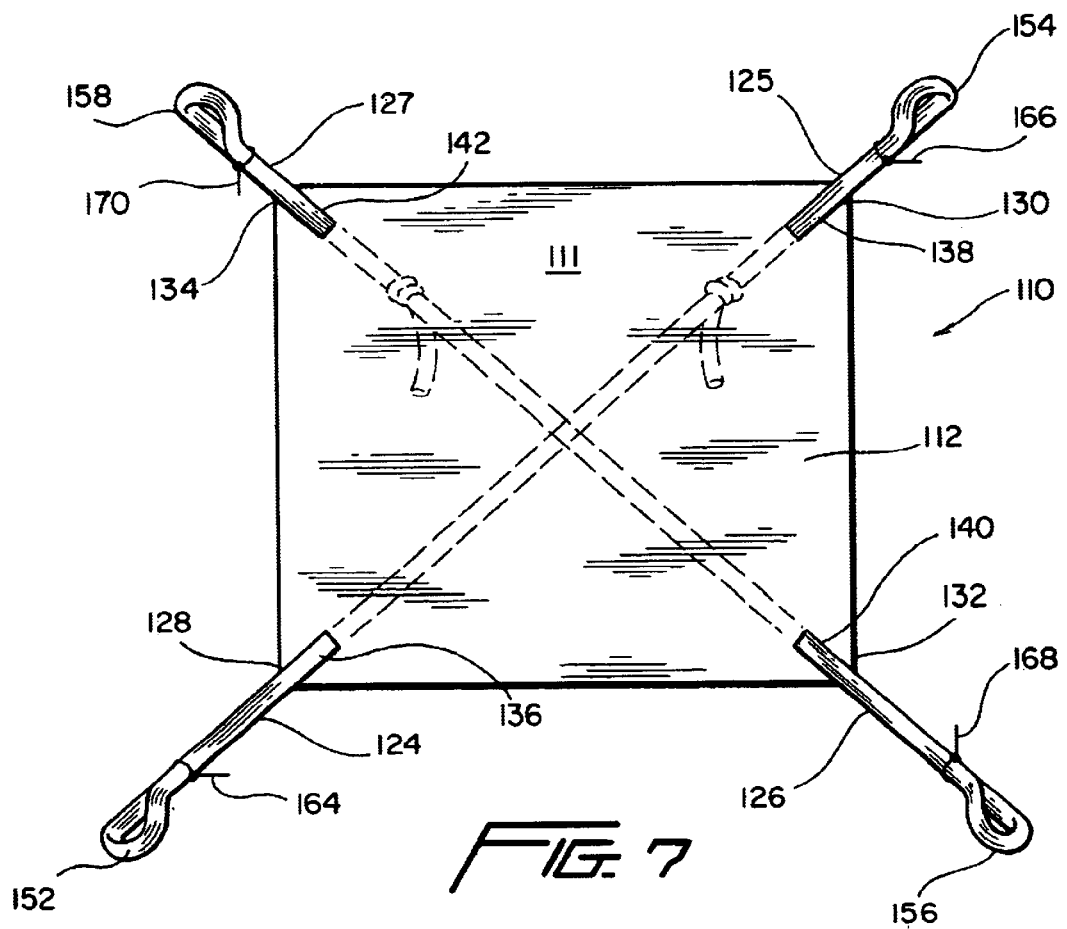
FIG. 7 is a front elevational view of a new and improved safety sheet cargo tie-down system constructed in accordance with the principles and teachings of the present invention for securing cargo loads within cargo containers.

As can best be appreciated from FIGS. 7,7a, and 8, as each one of securing straps 124,125,126,127 is routed around the corner regions 128,130,132,134 of the safety sheet 112, the securing straps 124,125,126,127 are doubled-over upon themselves at effectively intermediate portions thereof so as to define looped portions 152,154,156,158 which are effectively located within the vicinities of the corner regions of the X-shaped securing strap array or arrangement. As more particularly illustrated within FIG. 7a, which discloses looped portion 158 as an example of each looped portion 152, 154,156,158 of the securing straps 124,125,126,127, the free end portion 150 of the securing strap 127 is passed through a snap-hook type fastener 160 which, in turn, is adapted to be mated with a hook-type fastener 162 which is fixedly mounted upon an interior wall portion of the cargo container 118. Continuing further, the doubled-over intermediate portions of the securing straps 124,125,126,127 are loosely tied or secured together by suitable slip-ties as disclosed at 164,166, 168,170, and in order to actually mate or attach the paired securing straps 124,125 and 126,127 together, each one of the second free end portions 146,150 of the securing straps 125,127 has a suitable strapping fastener 172,174, commercially available from ITW FASTEX, Des Plaines, Ill., fixedly mounted thereon and through which the corresponding second free end portions 144,148 of the securing straps 124,126 are adapted to be passed.

Figure 10:
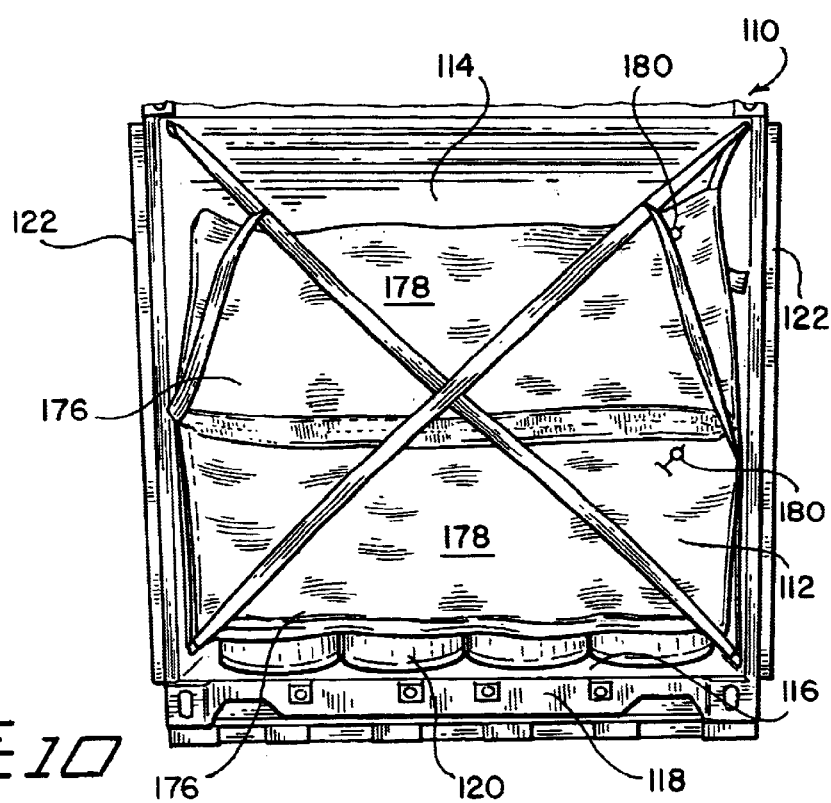
FIG. 10 is a rear elevational view, similar to that of FIG. 9, showing the new and improved safety sheet cargo tie-down system, as illustrated in FIGS. 7 and 8, as actually
Figure 2:
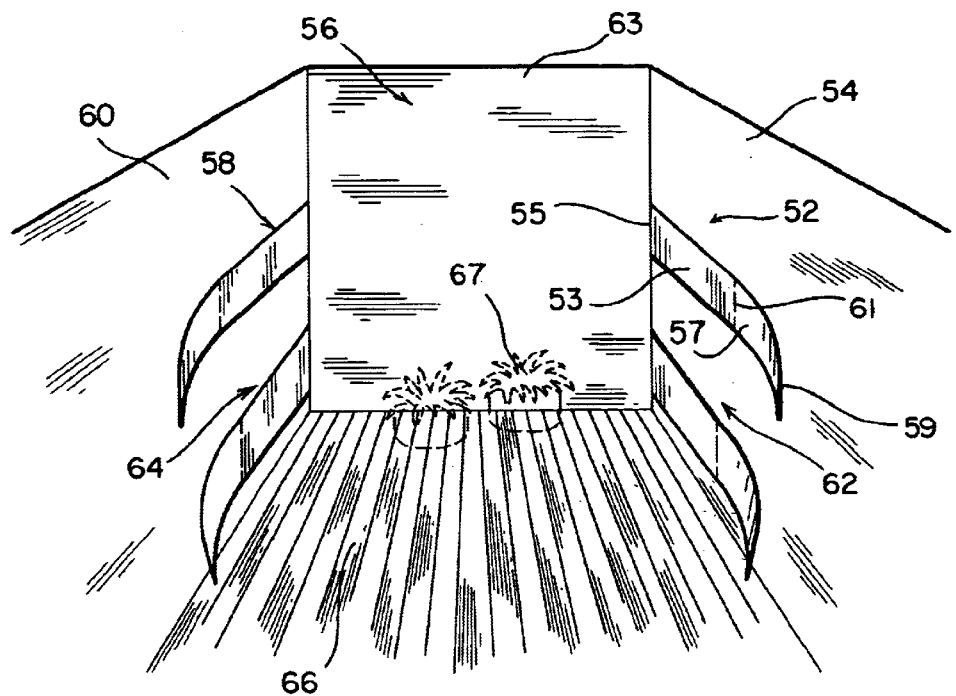
FIG. 2 is a rear elevational view of a truck bed showing a second conventional PRIOR ART system and technique for securing cargo loads thereon wherein cargo loads have begun to be initially loaded onto the truck bed.
Figure 3:
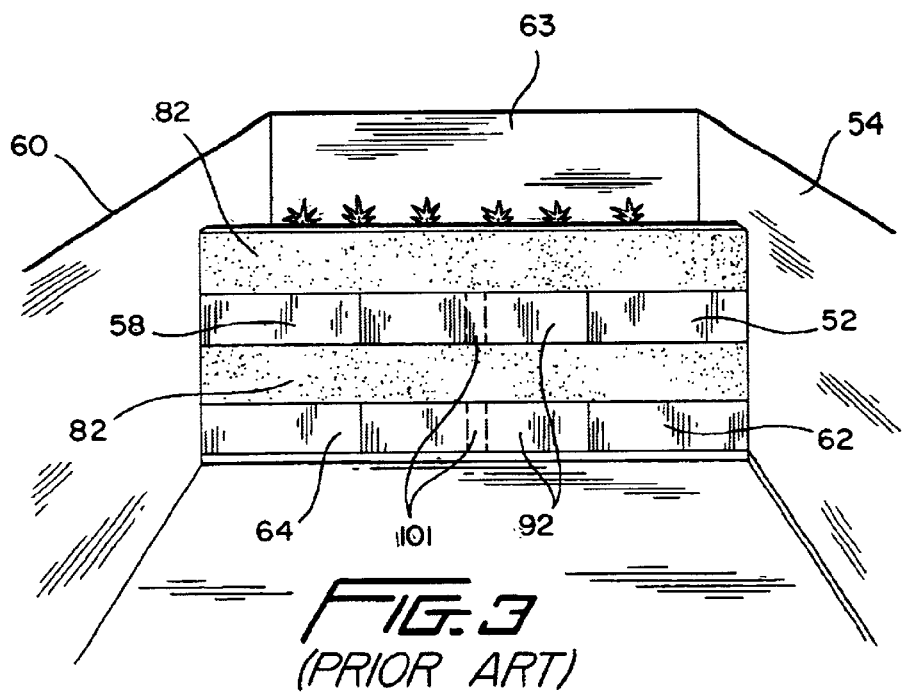
FIG. 3 is a rear elevational view similar to that of FIG. 2 showing the conventional PRIOR ART system in its finalized secured state with respect to a completed cargo load.
Figure 4:
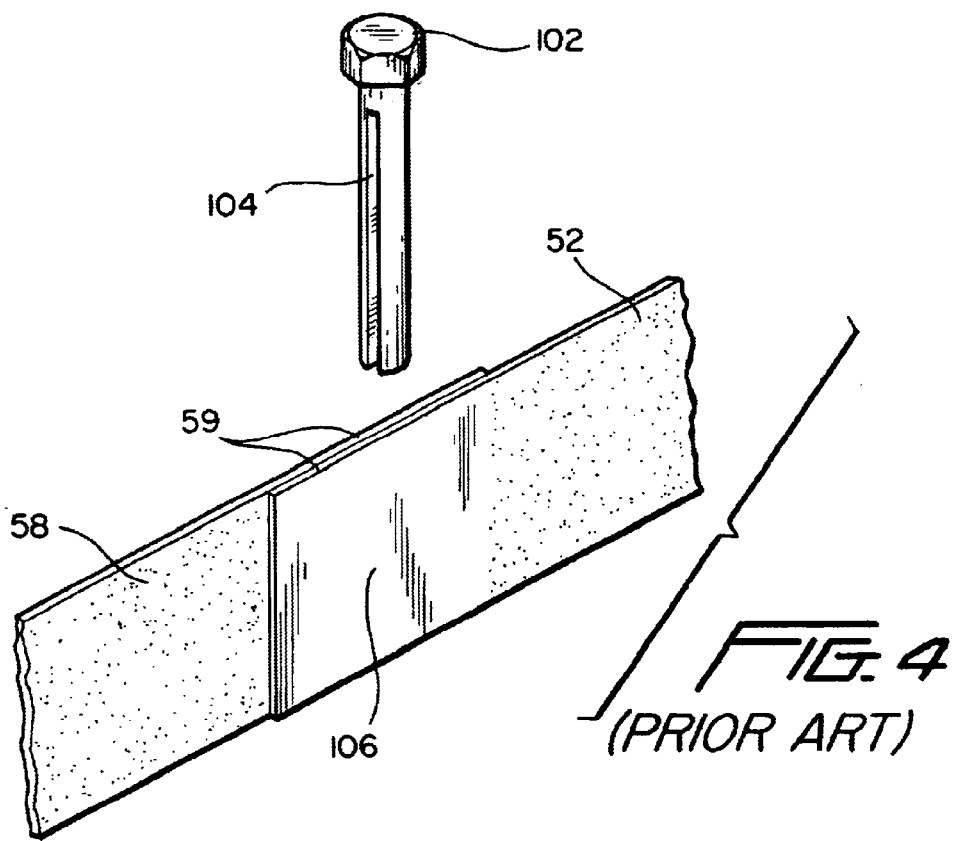
FIG. 4 is a perspective view of a special tool shown being used in conjunction with the overlapped ends of the securing panels of the cargo securing system, shown in FIGS. 2 and 3, for twisting the overlapped ends of the securing panels together so as to thereby tighten the same with respect to each other.
Figure 6:
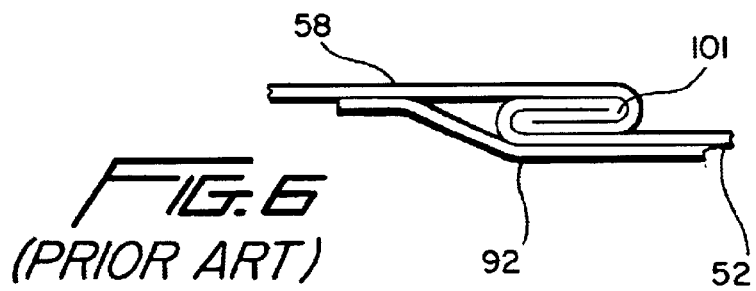
FIG. 6 is a top plan view similar to that of FIG. 5 showing the overlapped ends of the securing panels twisted together and tightened with respect to each other as illustrated in FIG. 5 after, however, the special tool, as shown in FIG. 4, has been removed from the twisted together and secured overlapped end portions of the securing panels.
Figure 5:
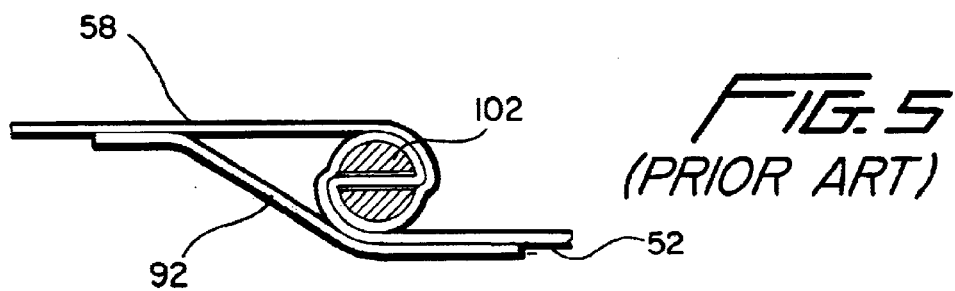
FIG. 5 is a top plan view of the overlapped ends of the securing panels showing the same twisted together by means of the special tool shown in FIG. 4 and secured in their tightened state by means of a TY-PATCH® adhesive panel.

As can therefore be readily appreciated, for example, from FIGS. 8 and 10, in view of the fact that all of the securing straps 124,125,126,127 are effectively free from, or not secured to, the safety sheet 112, other than being fixed upon the forwardly disposed surface 111 of the safety sheet 112 at the corner regions 128,130,132,134 thereof by means of the respective first end portions 136, 138,140,142, in view of the looped passage of the securing straps 124,125,126, 127 through the plurality of snap-hook fasteners 160 so as to effectively permit slidable movement of the securing straps 124,125,126,127 with respect to the plurality of snap-hook fasteners 160, and furthermore, in view of the engaged mounting of the plurality of snap-hook fasteners 160 upon the mounting hook fasteners 162 mounted upon the interior wall portions of the cargo container 118, when the free end portions 144,148 of the securing straps 124,126 are respectively pulled through the strapping fasteners 172,174, the pairs of securing straps 124,125, and 126,127 are tightened and tensioned with respect to each other so as to effectively remove any slack from such paired securing straps 124,125 and 126,127. Accordingly, the safety sheet 112 can in fact be properly erected, tensioned, and fixedly disposed with respect to the plurality of cargo load barrels or drums 120 as illustrated within FIGS. 9 and 10 so as to in turn fixedly secure the cargo load barrels or drums 120-within the cargo hold 116 of the cargo container 118.

Figure 9:
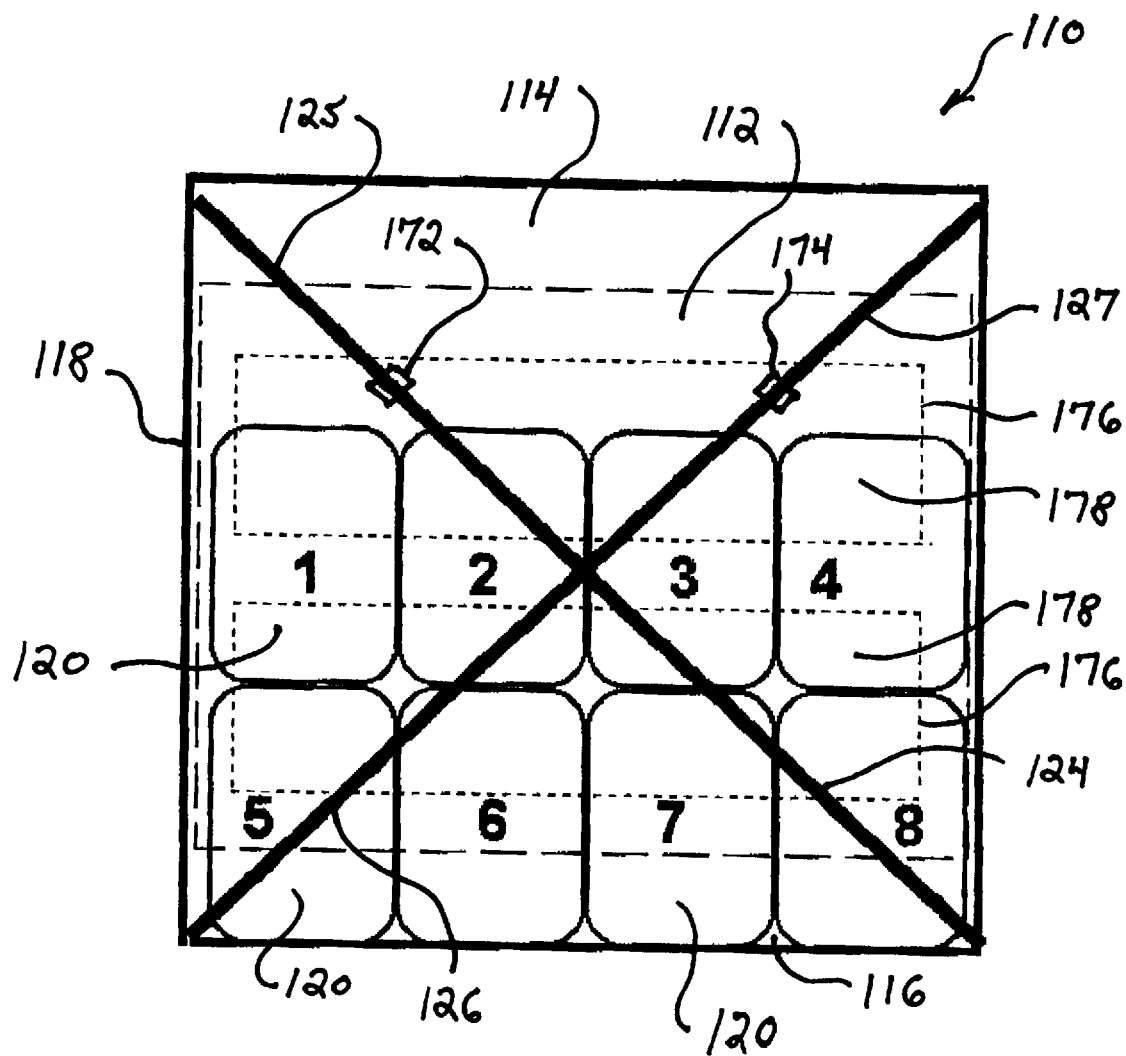
FIG. 9 is a schematic rear elevational view showing the new and improved safety sheet cargo tie-down system, as illustrated in FIGS. 7 and 8, being used to secure a plurality of cargo drums within a cargo container.

As a last important structural feature characteristic of the safety sheet cargo tie-down system 110 of the present invention, the safety sheet 112 comprises a pair of internal pockets 176 formed between the two plies of the dual-ply safety sheet 112 and within which a pair of inflatable bladders or air bags 178 are disposed as can be appreciated from FIGS. 9 and 10. Each one of the pockets 176 has an accordion-type expansion structure so as to readily permit the pocket structure 176 to expand as each one of the inflatable bladders or air bags 178 is inflated, and as shown in FIG. 10, each one of the inflatable bladders or air bags 178 has an inflation valve assembly 180 fluidically connected to an interior portion of the bladder or air bag 178, and externally accessible for connection to a source of pressurized air, not shown, so as to permit inflation and deflation of the bladder or air bag 178. Accordingly, it can readily be appreciated that after the safety sheet 112 has been installed and properly erected within the rear portion of the cargo hold 116 and in engagement with the cargo load barrels or drums 120 as a result of the securing straps 124,125,126,127 having their looped portions 152,154,156,158 mounted upon the securing hooks 162 of the cargo container 118 through means of the snap-hook fasteners 160, the safety sheet air bags 178,178 can be appropriately inflated. In this manner, the air bags 178,178 exert or impress appropriate forces upon or with respect to both the cargo load barrels or drums 120 as well as the paired securing straps 124, 125 and 126,127 disposed within the aforenoted X-shaped array or arrangement. Still further, the disposition of the inflatable air bags 178,178 within or upon the safety sheet 112 also provides impact protection for the cargo load barrels or drums 120. As a result of the foregoing structural components, the entire safety sheet tie-down system 110 is then properly secured within the rear portion of the cargo hold 116 so as to in turn securely retain the cargo load barrels or drums 120 within the cargo hold 116 of the cargo container 118 whereby the cargo load barrels or drums 120 will not be able to undergo any undesirable movements within the cargo hold 116, and in addition, none of the cargo load barrels or drums 120 will be inadvertently and dangerously discharged when, for example, the rear doors 122 of the cargo container 118 are opened by operator personnel.

Thus, it may be seen that in accordance with the principles and teachings of the present invention, there has been provided a new and improved safety sheet cargo tie-down system which comprises a substantially rectangular safety sheet, and four securing straps which are fixedly secured to corner regions of the substantially rectangular safety sheet upon the forwardly disposed surface thereof and which are effectively brought around such corner regions to the rearwardly disposed surface so as to form a pair of securing straps arranged within a criss-crossed X-shaped array or arrangement. Each pair of securing straps has a slip-type fastener fixedly secured upon one free end portion of one of the securing straps, and the free end portion of the other one of the securing straps is passed through such fastener. In this manner, as each pair of securing straps is tightened, the safety sheet is properly secured with respect to the cargo load barrels or drums. Further securing forces or pressures can be appropriately impressed or exerted upon the cargo load barrels or drums as a result of the proper inflation of the inflatable air bags, and such inflatable air bags also provide impact protection for the cargo loads. It can therefore be readily appreciated still further that the new and improved safety sheet cargo tie-down system of the present invention is relatively simple in structure, relatively simple to install, and relatively inexpensive and economical to fabricate or manufacture.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. A cargo tie-down system for use in connection with the securing of a cargo load within a cargo container, comprising:

a cargo-securing sheet adapted to be placed across the cargo load so as to substantially cover the cargo load;

at least one pair of securing straps secured at first end portions of each one of said at least one pair of securing straps to said cargo-securing sheet;

intermediate portions of said at least one pair of securing straps having looped portions formed therein for connection to fixed supports within the cargo container; and second end portions of said at least one pair of securing straps being adjustably fastened together so as to cause said looped portions of said at least one pair of securing straps to move with respect to the fixed supports within the cargo container and thereby remove any slack within said at least one pair of securing straps when said second end portions of said at least one pair of securing straps are tightened with respect to each other whereby said cargo-securing sheet is secured across the cargo load so as to secure the cargo load within the cargo container.

2. The system as set forth in claim 1 wherein:
said at least one pair of securing straps comprises two pairs of securing straps.

3. The system as set forth in claim 2, wherein:
said securing sheet has a substantially rectangular configuration; and said two pairs of securing straps have their first end portions fixedly secured within corner regions of said securing sheet.

4. The system as set forth in claim 3, wherein:

said first end portions of each one of said two pairs of securing straps are fixedly secured upon a first side surface of said securing sheet within said corner regions thereof, while second end portions of each one of said two pairs of securing straps are fastened together so as to form said two pairs of securing straps upon a second side surface of said securing sheet.

5. The system as set forth in claim 4, wherein:

said first side surface of said securing sheet is disposed toward the cargo load while said second side surface of said securing sheet is disposed away from the cargo load.

6. The system as set forth in claim 4, wherein:

said two pairs of securing straps fastened together upon said second side surface of said securing sheet are disposed within a criss-crossed substantially X-shaped arrangement.

7. The system as set forth in claim 6, wherein:

each one of said two pairs of securing straps, fastened together within said criss-crossed substantially X-shaped arrangement, is disposed along a diagonal of said substantially rectangular-shaped securing sheet.

8. The system as set forth in claim 2, further comprising:

snap-hook fasteners for mounted engagement upon the fixed supports of the cargo container and through which said intermediate looped portions of each one of said securing straps is passed.

9. The system as set forth in claim 1, wherein:

said securing sheet is fabricated from polypropylene.

10. The system as set forth in claim 1, wherein:

said securing sheet comprises a two-ply sheet structure;

at least one expansible pocket is defined within said two-ply securing sheet structure; and at least one inflatable air bag is disposed within said at least one expansible pocket such that when said at least one inflatable air bag is inflated, said at least one inflated air bag exerts pressurized forces upon said at least one pair of securing straps and the cargo load so as to secure the cargo load within the cargo container as well as provide impact protection for the cargo load.

11. In combination, cargo tie-down system for use in connection with the securing of a cargo load within a cargo container, comprising:

a cargo container within which the cargo load is to be disposed;

a plurality of fixed supports disposed within said cargo container;

a cargo-securing sheet adapted to be placed across the cargo load so as to substantially cover the cargo load;

at least one pair of securing straps secured at the first end portions of each one of said at least one pair of securing straps to said cargo-securing sheet;

intermediate portions of said at least one pair of securing straps having looped portions formed therein for connection to said fixed supports within said cargo container; and second end portions of said at least one pair of securing straps being adjustably fastened together so as to cause said looped portions of said at least one pair of securing straps to move with respect to said fixed supports disposed within said cargo container and thereby remove any slack within said at least one pair of securing straps when said second end portions of said at least one pair of securing straps are tightened with respect to each other whereby said cargo-securing sheet is secured across the cargo load so as to secure the cargo load within said cargo container.

12. The combination as set forth in claim 11, wherein:

said at least one pair of securing straps comprises two pairs of securing straps.

13. The combination as set forth in claim 12, wherein:

said securing sheet has a substantially rectangular configuration; and said two pairs of securing straps have their first end portions fixedly secured within corner regions of said securing sheet.

14. The combination as set forth in claim 13, wherein:

said first end portions of each one of said two pairs of securing straps are fixedly secured upon a first side surface of said securing sheet within said corner regions thereof, while second end portions of each one of said two pairs of securing straps are fastened together so as to form said two pairs of securing straps upon a second side surface of said securing sheet.

15. The combination as set forth in claim 14, wherein:

said first side surface of said securing sheet comprises a forwardly disposed surface of said securing sheet disposed toward the cargo load while said second side surface of said securing sheet comprises a rearwardly disposed surface of said securing sheet disposed away from the cargo load.

16. The combination as set forth in claim 14, wherein:

said two pairs of securing straps fastened together upon said second side surface of said securing sheet are disposed within a criss-crossed substantially X-shaped arrangement.

17. The combination as set forth in claim 16, wherein:

each one of said two pairs of securing straps, fastened together within said criss-crossed substantially X-shaped arrangement, is disposed along a diagonal of said substantially rectangular-shaped securing sheet.

18. The combination as set forth in claim 12, further comprising:

snap-hook fasteners for mounted engagement upon said fixed supports of said cargo container and through which said intermediate looped portions of each one of said securing straps is passed.

19. The combination as set forth in claim 11, wherein:

said securing sheet is fabricated from polypropylene.

20. The combination as set forth in claim 11, wherein:

said securing sheet comprises a two-ply sheet structure;

at least one expansible pocket is defined within said two-ply securing sheet structure; and at least one inflatable air bag is disposed within said at least one expansible pocket such that when said at least one inflatable air bag is inflated, said at least one inflated air bag exerts pressurized forces upon said at least one pair of securing straps and the cargo load so as to secure the cargo load within said cargo container as well as provide impact protection for the cargo load.

* * * * *